United States Patent
Wu et al.

(10) Patent No.: US 8,766,560 B1
(45) Date of Patent: Jul. 1, 2014

(54) ADAPTIVE LIGHT EMITTING DIODE DIMMING DRIVING CIRCUIT

(71) Applicant: Unity Opto Technology Co., Ltd., New Taipei (TW)

(72) Inventors: Chih-Hsien Wu, New Taipei (TW); Wei Chang, New Taipei (TW); Huan-Ying Lu, New Taipei (TW); Kai-Cheng Chuang, New Taipei (TW); Shao-Wei Chiu, New Taipei (TW)

(73) Assignee: Unity Opto Technology Co., Ltd., New Taipei (TW)

( * ) Notice: Subject to any disclaimer, the term of this patent is extended or adjusted under 35 U.S.C. 154(b) by 0 days.

(21) Appl. No.: 13/783,910

(22) Filed: Mar. 4, 2013

(30) Foreign Application Priority Data

Dec. 25, 2012 (TW) .............................. 101149726 A

(51) Int. Cl.
*H05B 37/02* (2006.01)

(52) U.S. Cl.
USPC ............................ 315/308; 315/291; 315/307

(58) Field of Classification Search
CPC ........ H05B 37/00; H05B 37/02; H05B 39/00; H05B 39/04; H05B 41/36

USPC ...... 315/185 R, 200 R, 209 R–211, 224–226, 315/291, 307, 308, 312, 318

See application file for complete search history.

(56) References Cited

U.S. PATENT DOCUMENTS 8,497,637 B2 * 7/2013 Liu ................................ 315/225
8,581,508 B2 * 11/2013 Horino .......................... 315/247

* cited by examiner

*Primary Examiner* — Jimmy Vu
(74) *Attorney, Agent, or Firm* — Rosenberg, Klein & Lee

(57) ABSTRACT

An adaptive LED dimming driving circuit is disclosed, wherein its control module is disposed with a first resistor, a second resistor, a retainer, a third resistor and a fourth resistor. When the control module receives an input voltage, the retainer is driven to output a retaining current $I_{hold}$ to the second resistor, thereby ensuring normal dimming. The first resistor and the third resistor detect the input voltage so that when an input current $I_{in}$ satisfies a correlation $I^{in}=I_{hold}+I_{LED}$, the retaining current has the minimum value to increase work efficiency during the LED that is dimmed to the maximum intensity. When the input voltage is too low, the reference level is reduced to prevent the LED from generating twinkling. The fourth resistor detects the voltage energy of the LED. Therefore, when the voltage energy is changed, a high-low-voltage compensation is performed to achieve a constant power state.

5 Claims, 5 Drawing Sheets

ADAPTIVE LIGHT EMITTING DIODE DIMMING DRIVING CIRCUIT

CROSS-REFERENCE TO RELATED APPLICATIONS

This non-provisional application claims priority under 35 U.S.C. §119(a) on Patent Application No(s). 101149726 filed in Taiwan, R.O.C. on Dec. 25, 2012, the entire contents of which are hereby incorporated by reference.

BACKGROUND OF THE INVENTION

1. Field of the Invention

The invention relates to a technical field of light emitting diode (LED) power equipment, and more particularly to an adaptive LED dimming driving circuit supporting TRI-electrode AC switch (TRIAC) that flexibly compensates outputted driving electricity by means of detecting the inputted electricity ripple voltage difference real-time so that the work efficiency of whole circuit can be improved, and the twinkling problem on LEDs can also be prevented.

2. Description of the Related Art

Currently, the driving circuit of an LED lamp is to linearly regulate the LED brightness and is accomplished by means of switching an input voltage conduction angle through a TRIAC. To retain the stable power for improving the illumination quality, a constant current architecture is usually adopted and allows an LED to cascade a transistor and a sensing resistor. A driving current $I_{LED}$ flowing through the LED is sensed by the sensing resistor so as to form a voltage drop at two ends. Afterward a high level switching signal or a low level switching signal is outputted to the transistor after utilizing a comparator to compare the voltage drop so that the transistor is conducted or cut off to properly regulate the duty ratio of a pulse width modulation (PWM) signal. Accordingly, the magnitude of the outputted driving voltage can be controlled by conducting cycle length through the PWM signal, thereby affecting the magnitude of driving current $I_{LED}$ and light emitting brightness of the LED.

As shown in FIG. 1, while inputting voltage 120V, a conventional linear dimming driving circuit is actually measured to obtain 7.3 watt, 69.1% whole circuit efficiency and 0.908 power factor for the LED. It should be noted that the driving circuit architecture is simple and can be obtained with high power factor. However, the figure also shows that although the brightness of the LED has been regulated to the maximum, the power consumption watt of the LED is still increased in accordance with the raising of inputted voltages. Consequently, the energy conversion efficiency will be seriously damaged. On the other hand, the LED may be affected by the fabrication process to have different physical properties so as to show different resistances such that the flowing current of each string of LEDs or an across voltage at two ends is not identical. Accordingly, the foregoing dimming method may affect the whole circuit efficiency due to different changes of voltages and current, and the problem of inaccurately dimming effect may occur. Moreover, the circuit architecture utilizing the transformer or the inductor to realize the switching of duty ratio of PWM signals has problems of electromagnetic interference (EMI) and twinkling. At this time, if safety components are increased, the work efficiency of the whole circuit is reduced to cause non-practicality. Additional circuits are increased to supply TRIAC reference working current. It may still work due to retaining current to form high idle work consumption since the LED is regulated to reach the maximum light emitting brightness.

Accordingly, improving the conventional dimming circuit architecture to properly regulate TRIAC retaining current through a simple detection circuit and effectively reducing idle work consumption while allowing the driving current $I_{LED}$ to retain at constant state are an important issue. Moreover, responding with LED's physical property, the high voltage compensation of inputted voltage is realized by utilizing a simple circuit architecture so that the whole circuit quality can be actually increased, and the light emitting power of the LED can be effectively improved. The foregoing situation will be also further discussed.

SUMMARY OF THE INVENTION

Therefore, upon the foregoing defects in prior arts, it is a primary objective of the present invention to provide an adaptive LED dimming driving circuit to control the magnitude of outputted driving voltage energy by means of linear regulation, thus preventing the LED from twinkling and retaining TRIAC dimming feature.

According to an objective of the invention, the adaptive LED dimming driving circuit is installed to a lamp board to drive and linearly regulate the illumination brightness of at least an LED and disposed with a dimming module, a rectification module and a control module. The rectification module is electrically connected to an external power source through the dimming module. The control module is electrically connected to the rectification module and the LED. The control module has a control chip, a regulator and a sensing resistor. The LED is coupled to the control chip through the regulator and the sensing resistor that are cascaded so that a sensing value is formed and fed back to the control chip after the sensing resistor senses a driving current $I_{LED}$ flowing through the LED. The sensing value is compared with a reference value to control the regulator regulating the driving current $I_{LED}$. The feature of the adaptive LED dimming driving circuit is that the rectification module is coupled to the dimming module through a regulator capacitor connected in parallel. The control module is disposed with a first resistor, a second resistor, a retainer, a third resistor and a fourth resistor. The retainer is electrically connected to the rectification module, the first resistor, the second resistor and the control chip. The first resistor is coupled to the second resistor and the control chip. The third resistor is electrically connected to the rectification module and the control chip. One end of the fourth resistor is coupled to the LED and the control chip while another end of the fourth resistor is coupled to the regulator and the sensing resistor, wherein when the rectification module outputs an input voltage to form an input current $I_{in}$, the control chip drives the retainer to outputs a retaining current $I_{hold}$ to the second resistor so that the input voltage is consumed by the second resistor to retain a normal work of the dimming module. The first resistor divides the input voltage to allow the control chip to detect a dimming intensity of the dimming module real-time such that under a condition of allowing the input current satisfying a correlation $I_{in}=I_{hold}+I_{LED}$, the retaining current has a minimum current value to increase a work efficiency when the LED is regulated to a maximum brightness; wherein when the input voltage raises, an across voltage at two ends of the fourth resistor is increased to compensate an across voltage at two ends of the sensing resistor so that the driving current $I_{LED}$ is reduced to achieve a constant power state, and the third resistor divides voltages and detects a ripple value of the input voltage. When the input voltage is reduced and the ripple value is smaller than a standard value, the control chip reduces the reference value to prevent the LED from generating twinkling phenomenon.

The circuit architecture of the invention does not utilize transformers or inductors to switch PWM signals so that there is no EMI problem, and there is no need to dispose safety components. Therefore, costs can be reduced, and the input voltage energy can be properly detected to regulate the magnitude of TRIAC retaining current so that problems of power consumption and much heat energy can be avoided due to outputted retaining current when the LED is regulated to the maximum brightness such that effects of improving the whole circuit efficiency to retain above 0.9 high power factor, stable illumination quality and improved product service life can be achieved. Moreover, the ripple value of the input voltage is detected by the third resistor. Therefore, when the brightness of the LED is reduced to decrease the input current, the control chip is properly reduced to determine whether or not the reference voltage level of the regulator is driven, thereby preventing the LED from generating twinkling phenomenon.

BRIEF DESCRIPTION OF THE DRAWINGS

The detailed structure, operating principle and effects of the present invention will now be described in more details hereinafter with reference to the accompanying drawings that show various embodiments of the invention as follows.

DETAILED DESCRIPTION OF THE PREFERRED EMBODIMENTS

The technical content of the present invention will become apparent by the detailed description of the following embodiments and the illustration of related drawings as follows.

Figure 1:
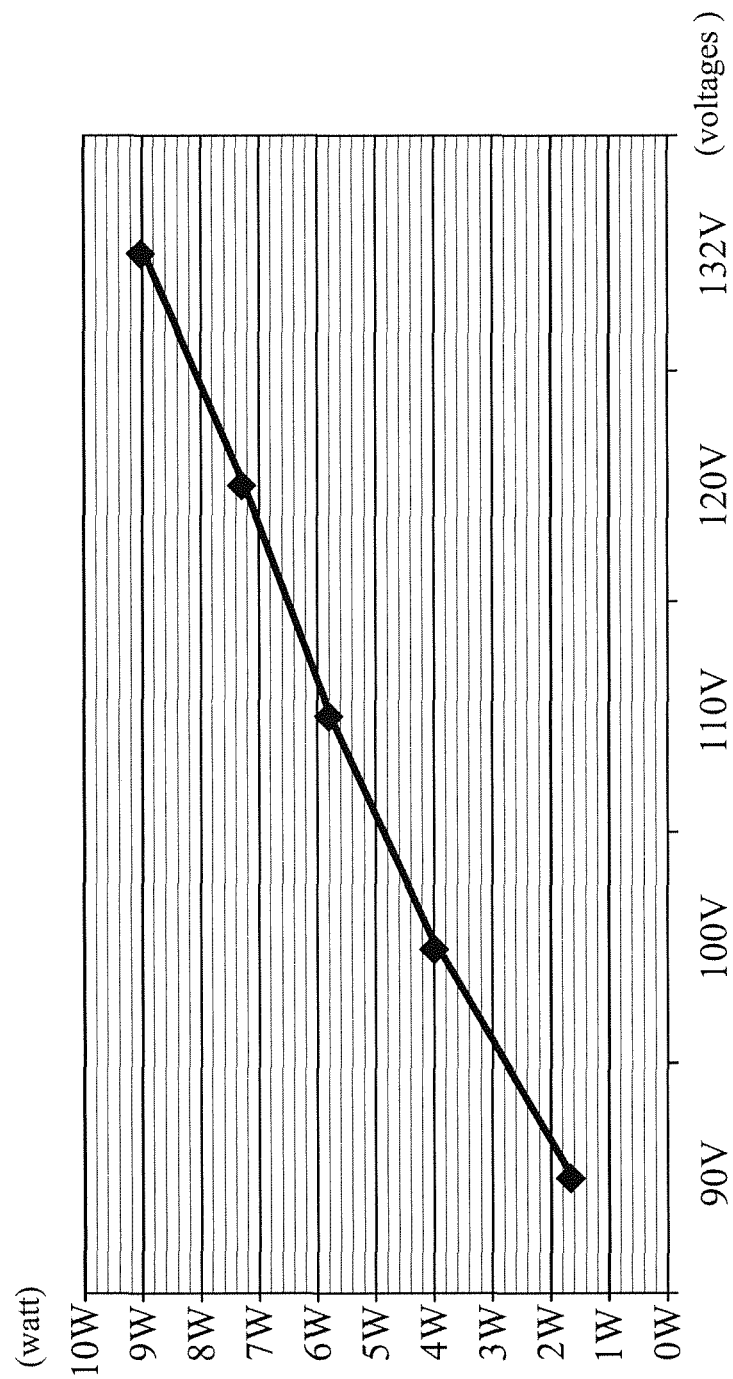
FIG. 1 is a measured diagram of a conventional LED power variation without high voltage feedback compensation.
Figure 2:
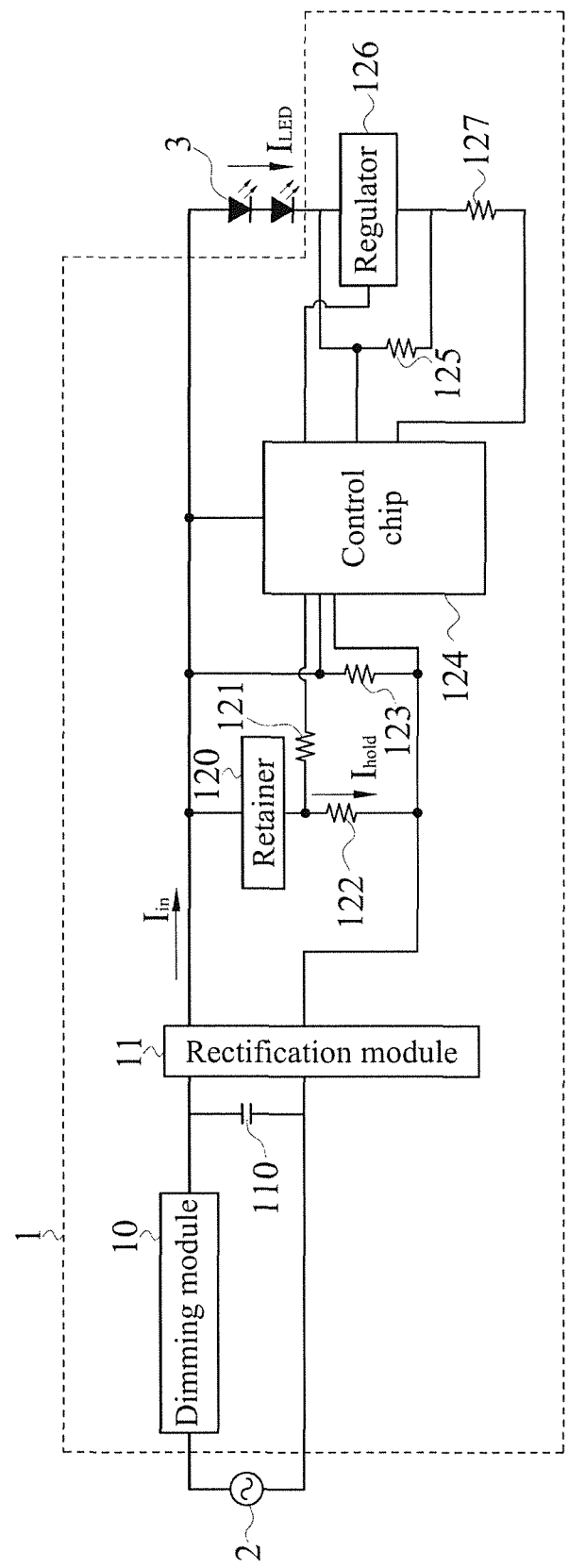
FIG. 2 is a block diagram of a first implementation according to a preferred embodiment of the invention.
Figure 3:
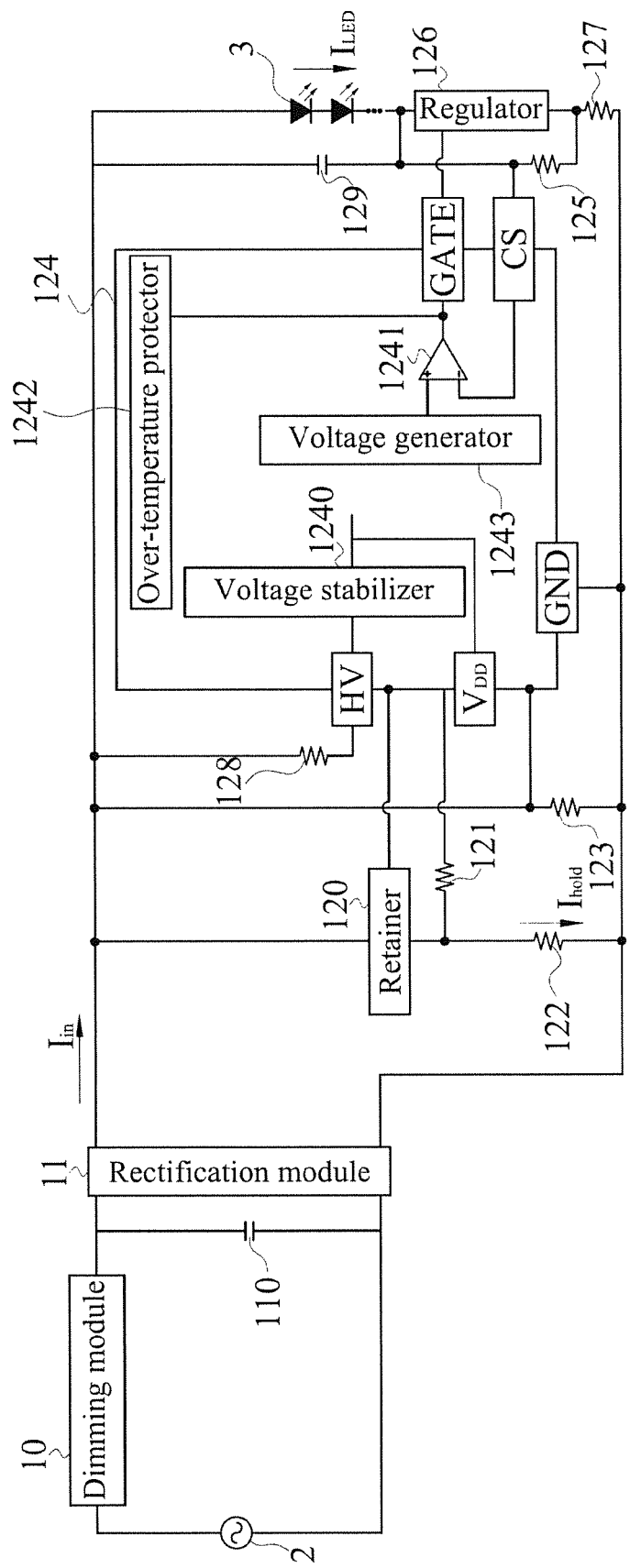
FIG. 3 is a block diagram of a second implementation according to a preferred embodiment of the invention.
Figure 4:
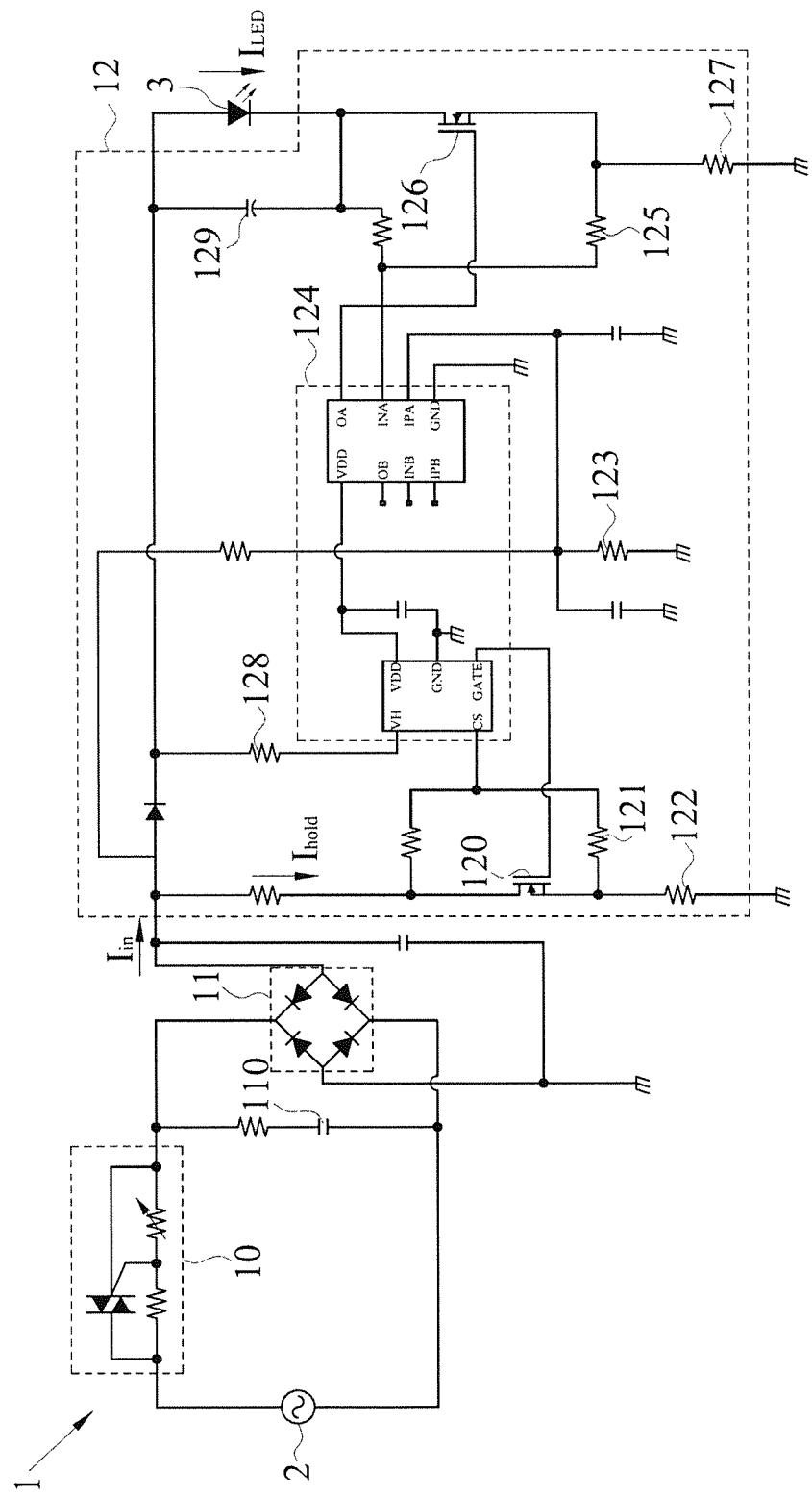
FIG. 4 is a circuit diagram of a second implementation according to a preferred embodiment of the invention.

With reference to FIG. 2 to FIG. 4 for a block diagram of an implementation and a block diagram and a circuit diagram of a second implementation according to a preferred embodiment of the invention are depicted. As shown in the figures, the adaptive LED dimming driving circuit 1 is normally disposed to a lamp board of a lamp to convert voltage energy of an external power source 2 so as to drive and linearly regulate the illumination brightness of at least an LED 3. The adaptive LED dimming driving circuit 1 is disposed with a dimming module 10, a rectification module 11 and a control module 12. The dimming module 10 is a TRIAC linear dimming circuit. The rectification module 11 is a bridge full-wave rectifier circuit coupled to the external power source 2 through the dimming module 10 after two ends of the rectification module 11 are connected to a regulator capacitor 110 so that alternating current voltage of the external power source 2 can be rectified to form a direct current input voltage. At this time, a total input voltage value outputted by the rectification module 11 can be changed through the dimming module 10 regulating the phase conduction angle of the alternating current voltage such that a driving voltage outputted to the LED 3 is affected to regulate the emitting brightness. The regulator capacitor 110 is an electrolytic capacitor capable of reducing current ripple to prevent electronic components from being damaged by surge voltages instantly generated by TRIAC dimming, thereby forming the effect of circuit protection.

The control module 12 is electrically connected to the rectification module 11 and the LED 3 and has a retainer 120, a first resistor 121, a second resistor 122, a third resistor 123, a control chip 124, a fourth resistor 125, a regulator 126 and a sensing resistor 127. The control chip 124 has five pins of HV, VDD, GATE, CS and GND and is disposed with a voltage stabilizer 1240, an operational amplifier 1241, an over-temperature protector 1242 and a voltage generator 1243. The retainer 120 is a transistor in which its one end is electrically connected to an output end of the bridge full-wave rectification circuit while another end is coupled to the first resistor 121 and the second resistor 122. The GATE is coupled to the control chip 124. Two ends of the first resistor 121 are respectively coupled to the second resistor 122 and the control chip 124. The third resistor 123 is coupled to the output end of the rectification module 11 and the control chip 124. One end of the fourth resistor 125 is electrically connected to the LED 3 and is coupled to a negative input end of the operational amplifier 1241 through CS pins of the control chip 124 while another end is coupled to the sensing resistor 127. The regulator 136 is a transistor in which one end is coupled to the LED 3 while another end is coupled to the sensing resistor 127. The GATE is coupled to the output end of the operational amplifier 1241 through the GATE pins of the control chip 124, and the regulator 136 can be placed on the surface of the lamp board to improve the heat dissipation efficiency.

The voltage stabilizer 1240 at high voltage and linearity is coupled to the output end of the rectification module 11 through a limiting resistor 128. A positive input end of the operational amplifier 1241 is coupled to the voltage generator 1243, and the output end is coupled to the over-temperature protector 1242 to prevent the adaptive LED dimming driving circuit from being damaged by over-temperature. When the rectification module 11 outputs the input voltage to form an input current $I_{in}$, the voltage stabilizer 1240 declines voltages to form a stable voltage energy of driving the work of the control chip 134 to drive the retainer 120 outputting a retaining current $I_{hold}$ to the second resistor 122 such that the input voltage can be consumed by the second resistor 122 to retain the normal work of the dimming module 10. Accordingly, the current value of the retaining current $I_{hold}$ can be retained by regulating the resistance of the second resistor 122 and can be widely applicable for different kinds of TRIAC dimming modules 10 having different specifications. The limiting resistor 128 limits the voltage energy magnitude outputted by the voltage stabilizer 1240 to achieve protection effect. At the same time, the first resistor 121 detects the input voltage real-time to divide voltages at two ends to form an across voltage such that the across voltage is compared with a comparison value through the control chip 124 to drive the retainer 120 regulating the magnitude of the retaining current. Further, the input current satisfies a correlation $I_{in=Ihold}+I_{LED}$ to allow the control chip 124 to regulate the retainer 120 by corresponding to the variation of the input current so that when the LED 3 is regulated to reach the maximum brightness, the retaining current has the minimum current value to increase the work efficiency.

Figure 5:
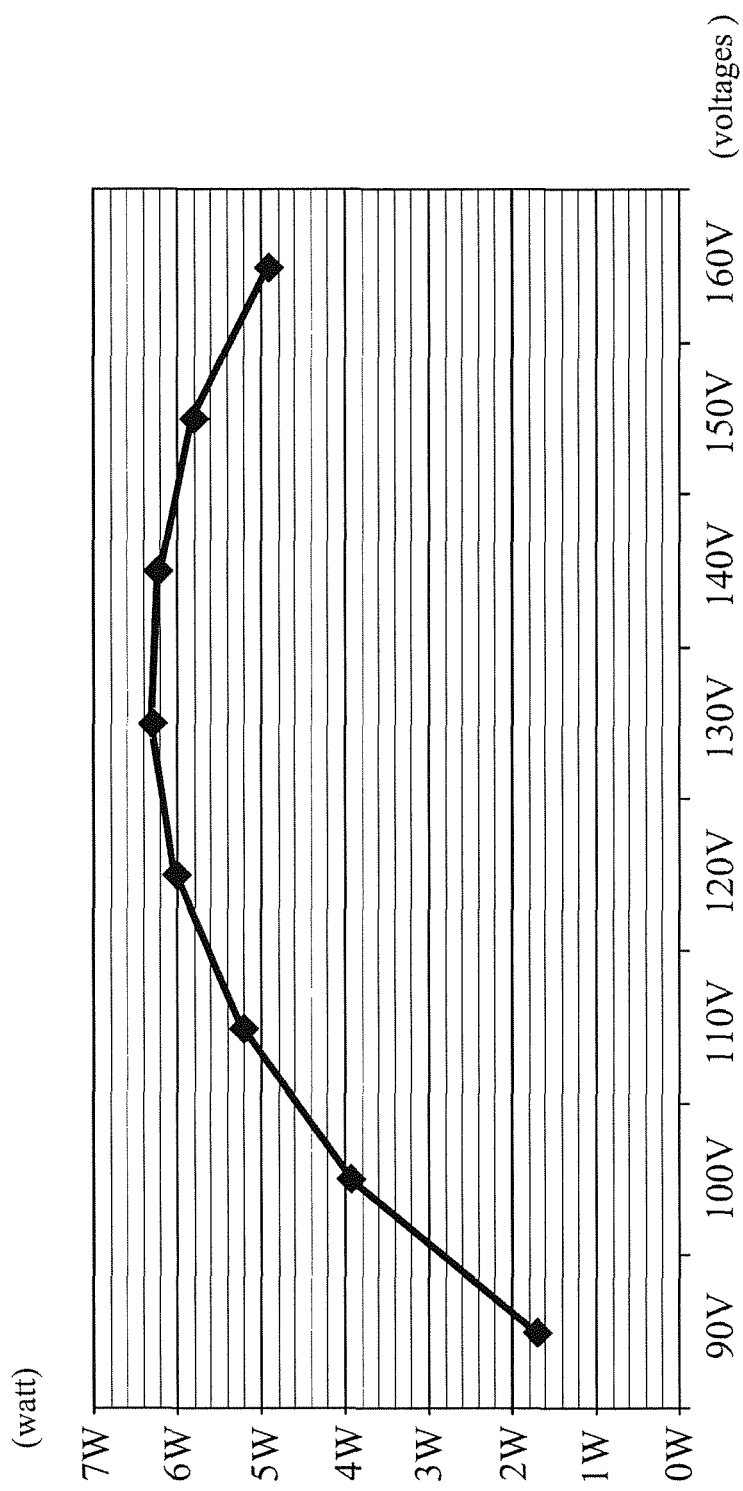
FIG. 5 is a measured diagram of LED power variation of a second implementation according to a preferred embodiment of the invention.

After the sensing resistor 127 senses a driving current $I_{LED}$ flowing through the LED 3, a sensing value is formed and fed back to the control chip 124 so that the sensing value is compared with a reference value through the control chip 124 to control the regulator 126 regulating the driving current $I_{LED}$. When the input voltage is raised to increase the driving voltage taken by the LED 3, the across voltage at two ends of the regulator 126 is increased. Similarly, the across voltage at two ends of the fourth resistor 125 is also increased to compensate the across voltage at two ends of the sensing resistor 127. However, if the voltage generator 1243 provides constant 0.5V to the operational amplifier 1241, voltage drops at two ends of the fourth resistor 125 and the sensing resistor 127 must be fixed at 0.5V. Accordingly, with the compensation efficacy formed by the fourth resistor 125, current flowing through the sensing resistor 127 will be reduced to effectively decrease the driving current $I_{LED}$. While steadying the light emitting efficiency, simultaneously the LED can be prevented from being damaged due to over-voltage. On the contrary, when the input voltage is decreased, across voltage at two ends of the fourth resistor 125 and the sensing resistor 127 is accordingly reduced to allow the control chip 124 to drive the regulator 126 so as to increase the driving current $I_{LED}$ so that when the driving voltage is changed due to different physical properties of each LED, high-low voltage compensation is properly performed. Therefore, an actual measured result as shown in FIG. 5, the input current shows a similarly sinusoidal waveform. Further, when the input voltage is 120V, the LED power is 6W, the adaptive LED dimming driving circuit efficiency is 66.9%, and PF is 0.926. Although the input voltage is increased, the power consumption of the LED is still retained at a range without increasing, thereby achieving constant power state.

It should be noted the third resistor 123 divides voltages and detects the ripple value of the input voltage. When the input voltage is decreased to allow the ripple value to be smaller than a standard value, for example, the input voltage is lower than 40V to allow the ripple value to be smaller than 0.5V, the control chip 124 can utilize additional amplifiers to reduce the reference value. The control chip 124 can be prevented from continuously regulating the regulator 126 to eliminate problems of twinkling phenomenon occurring on the LED 3 or abnormal works.

In the embodiment, the LED 3 is connected to a driving capacitor 129 having greater capacitance in parallel to charge or discharge the driving current $I_{LED}$ to enhance the anti-noise capability of circuits, thereby forming efficacies of voltage stabilization and protecting the LED.

What is claimed is:

1. An adaptive LED (light emitting diode) dimming driving circuit, installed to a lamp board, for driving and linearly regulating an illumination brightness of at least an LED, and disposed with a dimming module, a rectification module and a control module, whereby the rectification module is electrically connected to an external power source through the dimming module, the control module is electrically connected to the rectification module and the LED, the control module having a control chip, a regulator and a sensing resistor, the LED is coupled to the control chip through the regulator and the sensing resistor, which are cascaded so that a sensing value is fed back to the control chip after the sensing resistor senses a driving current $I_{LED}$ flowing through the LED, a reference value is utilized to compare with the sensing value to control the regulator to regulate the driving current $I_{LED}$, characterized in that the adaptive LED dimming driving circuit comprises:

the rectification module coupled to the dimming module through a regulator capacitor connected in parallel, the control module disposed with a first resistor, a second resistor, a retainer, a third resistor and a fourth resistor, the retainer electrically connected to the rectification module, the first resistor, the second resistor and the control chip, wherein the first resistor coupled to the second resistor and the control chip; the third resistor electrically connected to the rectification module and the control chip, one end of the fourth resistor coupled to the LED and the control chip while another end of the fourth resistor is coupled to the regulator and the sensing resistor, wherein when the rectification module outputs an input voltage to form an input current the control chip drives the retainer to outputs a retaining current $I_{hold}$ to the second resistor so that the input voltage is consumed by the second resistor to retain a normal work of the dimming module, the first resistor dividing the input voltage to allow the control chip to detect a dimming intensity of the dimming module real-time such that under a condition of allowing the input current satisfying a correlation $I_{in}=I_{hold}+I_{LED}$, the retaining current having a minimum current value to increase a work efficiency when the LED is regulated to a maximum brightness; wherein when the input voltage raises, an across voltage at two ends of the fourth resistor is increased to compensate an across voltage at two ends of the sensing resistor so that the driving current $I_{LED}$ is reduced to achieve a constant power state, and the third resistor divides voltages and detects a ripple value of the input voltage, and when the input voltage is reduced and the ripple value is smaller than a standard value, the control chip reduces the reference value to prevent the LED from generating twinkling phenomenon.

2. The adaptive LED dimming driving circuit of claim 1, wherein the dimming module is a bidirectional triode thyristor linear dimming circuit for receiving and regulating a phase conduction angle of the external power source to change the input voltage such that a driving voltage outputted to the LED is affected to regulate a light emitting brightness, and the rectification module is a bridge full-wave rectification circuit, and the regulator capacitor is an electrolytic capacitor for reducing a current ripple to form a circuit protection.

3. The adaptive LED dimming driving circuit of claim 2, wherein the first resistor divides the input voltage to form an across voltage at two ends of the first resistor, and the control chip compares the across voltage with a comparison value with respect to the input current to drive the retainer regulating magnitudes of the retaining current.

4. The adaptive LED dimming driving circuit of claim 3, wherein the control chip is disposed with a voltage stabilizer and an operational amplifier, and a positive input end of the operational amplifier is coupled to the third resistor while a negative input end of the operational amplifier is coupled to the fourth resistor, and an output end of the operational amplifier is coupled to the regulator, and the voltage stabilizer is coupled to an output end of the rectification module through a limiting resistor so that a voltage energy of the control chip is restricted and activated by the limiting resistor.

5. The adaptive LED dimming driving circuit of claim 4, wherein the regulator is a transistor placed on a surface of the lamp board to improve heat dissipation efficiency, and the LED is connected to a driving capacitor in parallel to charge and discharge the driving current $I_{LED}$, thereby enhancing the circuit anti-noise capability.

* * * * *